United States Patent [19]

Wright

[11] Patent Number: 4,728,122
[45] Date of Patent: Mar. 1, 1988

[54] DRIVER KNEE SHIELD TO COVER STEERING COLUMN PROTRUSIONS BELOW STEERING WHEEL OF TRACTOR-TRAILER RIGS

[76] Inventor: James N. Wright, Rte. 3, Box 330, Wytheville, Va. 24382

[21] Appl. No.: 848,648

[22] Filed: Apr. 7, 1986

[51] Int. Cl.⁴ .............................................. B60R 21/05
[52] U.S. Cl. ........................................ 280/750; 296/74
[58] Field of Search ....................... 280/750, 751, 752; 180/90; 296/70, 72, 74

[56] References Cited

U.S. PATENT DOCUMENTS

| | | | |
|---|---|---|---|
| 2,436,461 | 2/1948 | Tritt et al. | 280/751 |
| 3,194,338 | 7/1965 | Rutman et al. | 180/90 |
| 3,930,665 | 1/1976 | Ikawa | 280/751 |
| 3,938,821 | 2/1976 | Haas et al. | 280/750 |

Primary Examiner—David M. Mitchell
Assistant Examiner—Ross Weaver
Attorney, Agent, or Firm—W. Brown Morton, Jr.

[57] ABSTRACT

Driver's knee guard in cab of tractor-trailer rig. A metal sheet extends around the steering wheel and controls and is secured at its opposite ends to the dashboard. Foam rubber separates the inner side of the metal sheet from the steering wheel and controls, and leather-like material covers the outer side of the metal sheet.

1 Claim, 4 Drawing Figures

DRIVER KNEE SHIELD TO COVER STEERING COLUMN PROTRUSIONS BELOW STEERING WHEEL OF TRACTOR-TRAILER RIGS

BACKGROUND OF THE INVENTION

1. Field of the Invention

This invention relates to a protective cover which will encase the air valve bracket often attached to, and protruding from, the steering column of the tractor of a tractor-trailer rig, and will deflect the knees of the driver of such vehicle away from said protruding bracket in the event of a collision, thereby preventing serious injury to the knees of a driver involved in a collision.

2. Description of the Prior Art

The prior art discloses no knee protective devices specifically designed for use on larger trucks. Among existing patents, the only one at all close to my structure is U.S. Pat. No. 4,383,704, assigned to Toyota. The Toyota patent is aimed at protecting the driver's knees from injury caused by the knees hitting the steering column itself, rather than protecting the knees from impact with hardware attached to the steering column. The more general purpose of the Toyota patent results in a device which would actually be a hindrance if placed in a tractor-trailer cab; specifically, it would either interfere with or completely block the following: the oil pressure gauge and heat gauge and turn signal on the left hand of the steering post, and the air pressure gauge and fuel gauge on the right hand side of the steering post.

Finally, the complexity of the Toyota device renders it infeasible for retrofitting on tractor-trailer trucks presently on the road. Yet such a device is precisely what is needed. Many drivers of tractor-trailer trucks have been permanently disabled because of knee injuries received when they were thrown into the air valve bracket. Such injuries continue to occur at an alarming rate. My invention would provide the first economical, easily retrofitted knee protective device for tractor-trailer trucks of which I am aware. I have been a driver of such trucks for many years.

OBJECTS OF THE INVENTION

It is a principal object of the present invention to provide a device which will protect the knees of the driver of a tractor-trailer vehicle from serious injury during a collision by providing a protective shield around the protruding air valve bracketattached to the steering column, which said shield will deflect the knees away from the bracket in the event of a collision.

It is a further object of the present invention to provide a device which will prevent the knees of the driver of a tractor-trailer vehicle from being thrown into the air valve bracket during a collision, and yet will not interfere with or in any way block the driver's access to the turn signal and the various gauges attached to the steering column.

It is a further object of the present invention to provide a knee protective device which can be easily installed in tractor-trailer vehicles already in operation.

It is a further object of the present invention to provide a knee protective device which is very economical, yet highly efficient.

SUMMARY

A protective cover for the air valve bracket which protrudes from the steering column in a tractor-trailer vehicle; said cover deflects the knees of the driver away from such bracket in the event of a collision, thereby preventing serious injury to the knees. The device, in its preferred form, is shaped like a double trapezoid, i.e., a trapezoid from which extends, on the longer of its two parallel sides and centrally placed, a somewhat smaller trapezoid. The device consists of various layers, with each layer comprising a single piece of material. In a preferred embodiment, the layers are $\frac{1}{4}''$ leather, surmounting $\frac{1}{4}''$ aluminum, surmounting $1''$ foam rubber; the entire device is then encased in vinyl for attractive appearance and easy maintenance. The overall dimensions of the preferred device are approximately as follows: the two parallel sides of the larger trapezoid are $19''$ lower and $15''$ upper; the width of the larger trapezoid is $4''$; the smaller trapezoid extends from the middle $12''$ of the longer parallel side of the larger trapezoid, tapering to $10''$ in length, and is $2''$ wide. From this smaller trapezoid extend two straps, one with a buckle and the other having holes, which are then used to secure the upper portion of the device snugly around the steering column. The lower portion of the device is attached to the dashboard through the use of four screws, one in each corner of the larger trapezoid.

The above-described features of the present invention are explained in the detailed description below. It is to be read in conjunction with the accompanying drawings.

The invention is useful to drivers of tractor-trailer vehicles who presently have nothing to prevent their knees from being thrown directly into the air valve bracket attached to the steering column in the event of a collision.

DETAILED DESCRIPTION

Figure 1:
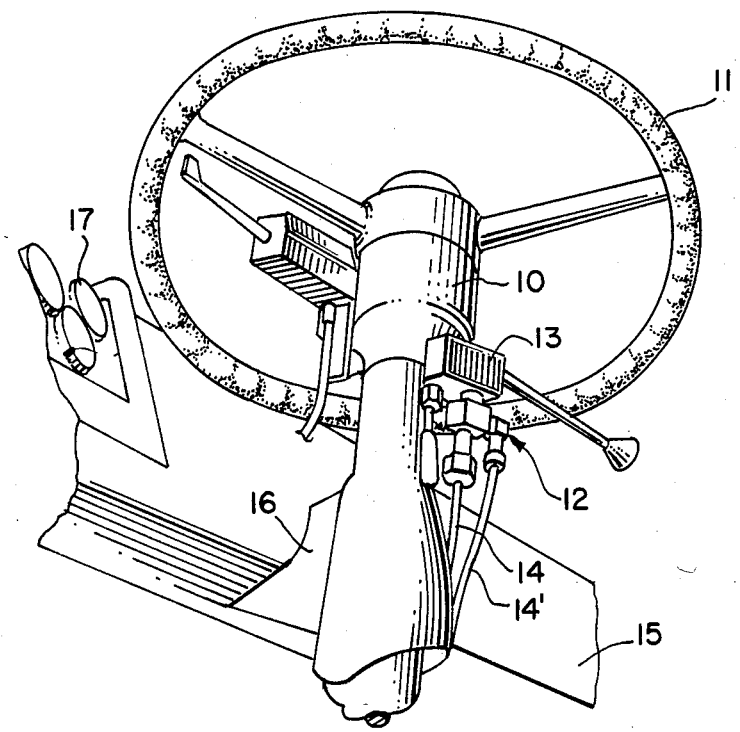
FIG. 1 shows the air valve bracket as seen from the left rear of the steering column looking at it from below without the device of the invention installed.

As shown in FIG. 1, which is a perspective of a portion of the interior of the cab of a tractor used in a heavy tractor-trailer rig, the steering column 10 is topped by the steering wheel 11. An air valve bracket assembly 12 is attached to the right rear of the column 10 below the wheel 11. This bracket assembly 12 carries on top the air valve proper 13 which controls the flow through downwardly extending tubes 14, 14'. A dashboard 15 extends across the cab and supports the column 10 through the fixture 16. The dashboard 15 also carries the instrument and control panels 17. The device of my invention is intended to protect the knees of the driver from impact with the valve bracket assembly 12 in the event of accident, without obscuring, or interfering with, the instruments and controls carried by panels 17.

Figure 2:
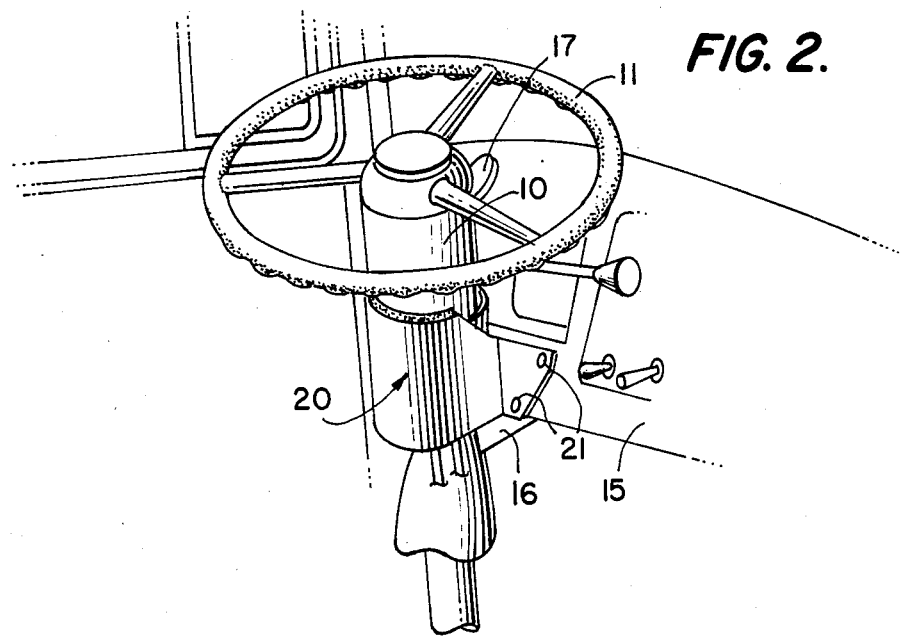
FIG. 2 shows a perspective view from the right of the device in position covering the air valve bracket and attached to the dashboard.
Figure 3:
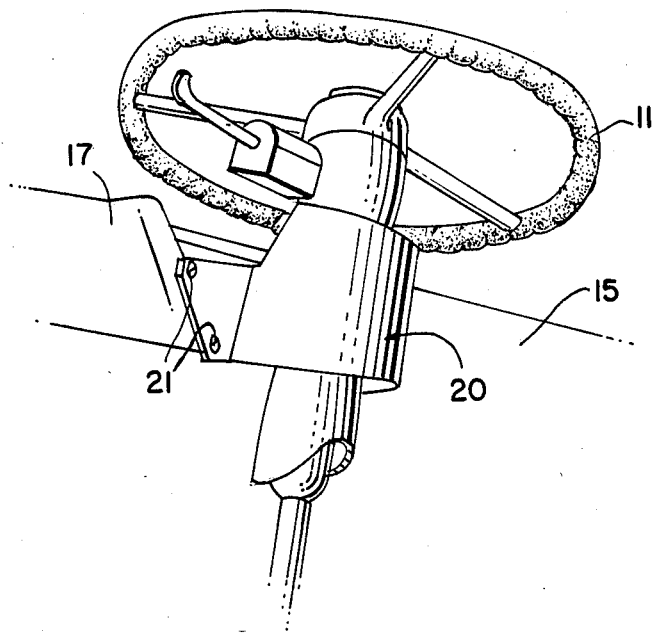
FIG. 3 shows a like perspective from the left.
Figure 4:
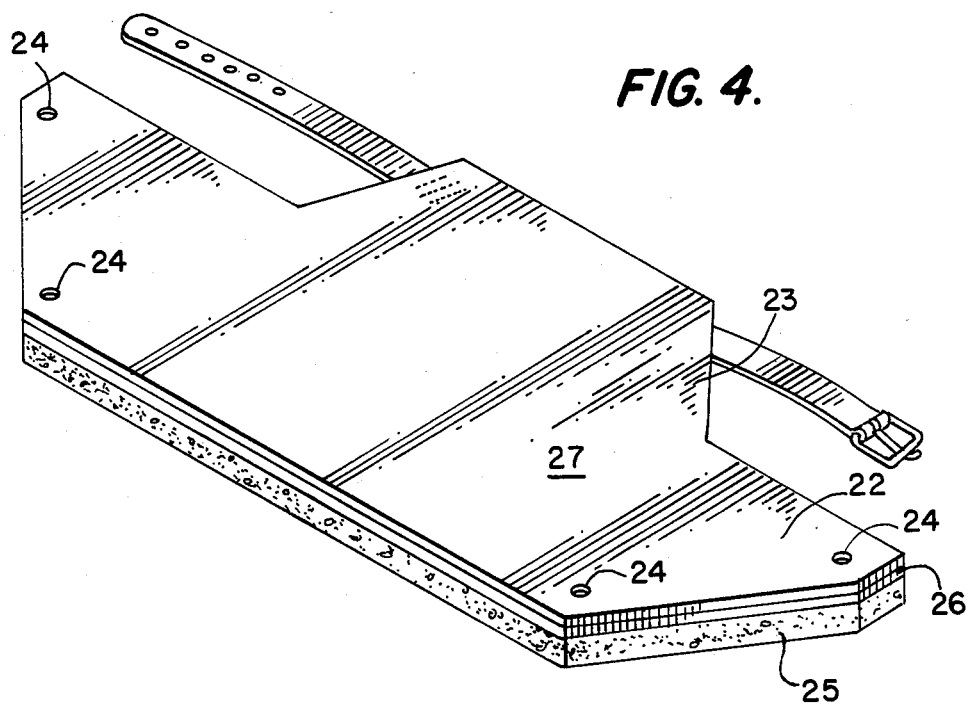
FIG. 4 shows a top perspective view of the device without its ornamental cover prior to installation.

Turning now to FIGS. 2 and 3, the device, generally denotd 20, of my invention is shown in place in the cab, secured to the dashboard 15, and covering a part of the column 10 between the wheel 11 and the fixture 16. This device 20 is secured to the dashboard 15 by four screws or bolts 21. The device 20 is preferably formed as a laminate as shown in FIG. 4. At least the rear surface and the edges of the device 20 are preferably covered with an ornamental sheet of vinyl, not shown in FIG. 4.

Turning now to the showing of FIG. 4, it depicts the device 20 in the planar form in which it is assembled prior to bending it to the shape shown in FIGS. 2 and 3 in which it is attached to the dahsboard 15. This shape can be appropriately described as yielding a central transverse cross-section of a generally U-shape with wings extending outwardly from the tops of the upward arms of the U, generally perpendicular to the arms.

The device 20 is formed of a laminate with the inner layer 25 that is to be positioned adjacent the column 10 when mounted on the dashboard 15, preferably made from 0.5 to 1.0 inch thick foam rubber, a middle layer 26, preferably from 0.156 to 0.312 thick sheet aluminum, and an outer layer 27, preferably of leather or leather-like synthetic of from 0.125 to 0.25 inches in thickness.

In outline, the device 20 in its planar state has a lower transverse portion 22, the outward ends of which are preferably slanted as shown to form, conceptually, a downwardly tapering trapezoid and a shorter upper transverse portion 23, the outward ends of which are preferably slanted as shown to form, conceptually an upwardly tapering trapezoid. Portion 23 is centered on portion 22 and the conceptual line of division between then is a line parallel to the bottom of portion 22 and to the top of portion 23.

Screwholes 24 are provided adjacent to the outboard ends of portion 22 to accommodate the screws or bolts 21 by which the device 20 is attached to the dashboard 15. Having now fully described a preferred form of the device 20 of my invention, what I desire to secure by letters patent is set forth in the appended claims.

I claim:

1. A tractor for a tractor-trailer rig, comprising a cab for a driver, a steering wheel, a substantially vertical steering column supporting the steering wheel at the upper end of the column, controls for an air valve system, a bracket assembly containing said controls, and mounted on the steering column beneath the steering wheel at about the level of the knees of a driver holding the steering wheel a dashboard extending horizontally within the cab beneath the level of the steering wheel and facing the driver on the opposite side of the steering column, and knee guard means between said assembly and the position of a driver's knees, said knee guard means comprising an elongated metal sheet curved around the steering column and said assembly and secured at its opposite ends to the dashboard, said knee guard means also comprising a layer of foam rubber next to the curved portion of the metal sheet, said knee guard means also comprising a layer of leather-like material next to the metal sheet, the metal sheet being secured between the foam rubber and the leather-like material with the foam rubber closest to the steering column and said assembly.

* * * * *